Sept. 4, 1956  I. C. SCHANTZ  2,761,587
AUTOMATIC WATER SHUTOFF DEVICE
Filed Feb. 28, 1955  2 Sheets-Sheet 1
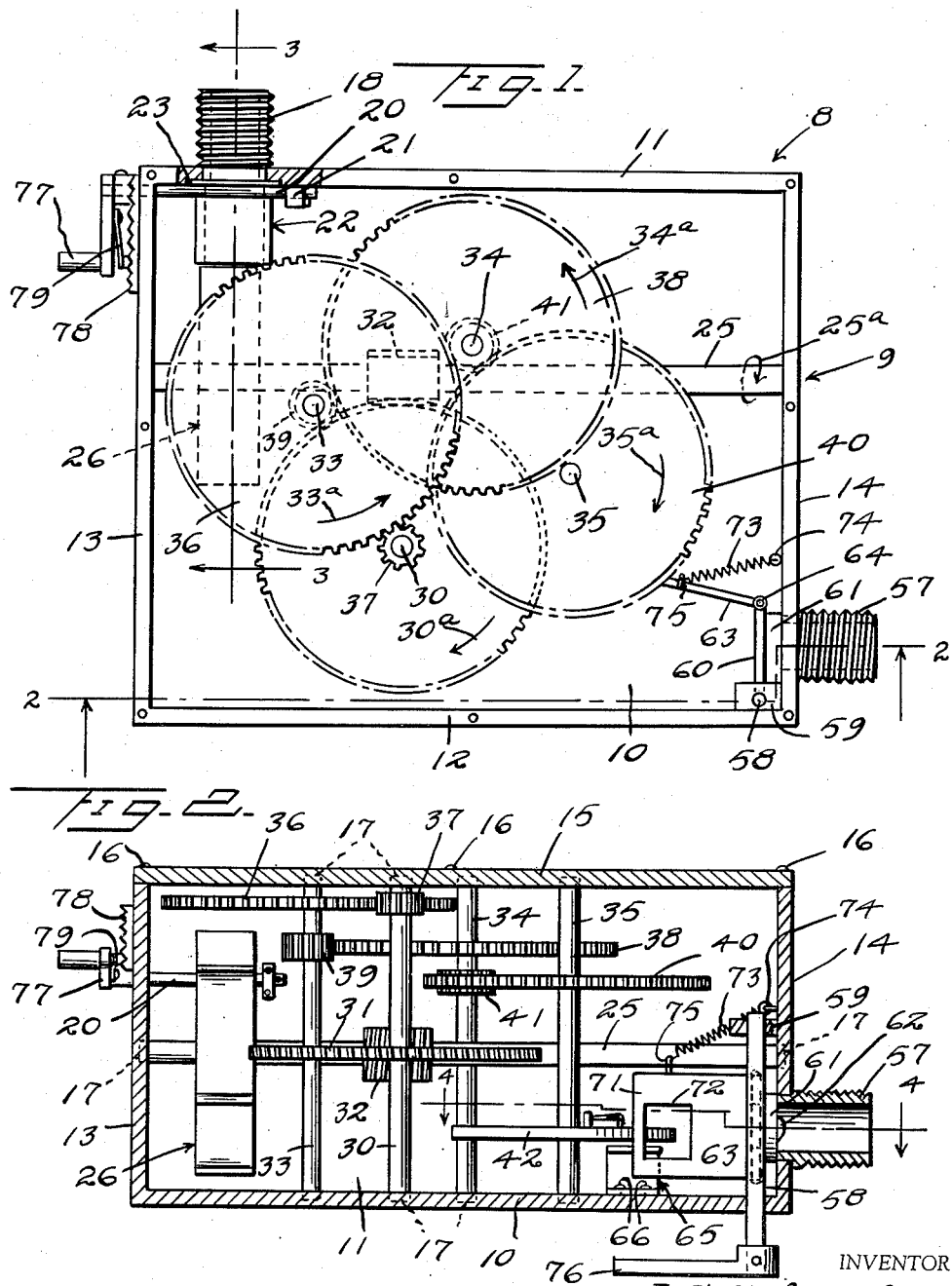
INVENTOR
I. C. Schantz
BY John H. Randolph
ATTORNEY Sept. 4, 1956  I. C. SCHANTZ  2,761,587
AUTOMATIC WATER SHUTOFF DEVICE
Filed Feb. 28, 1955  2 Sheets-Sheet 2
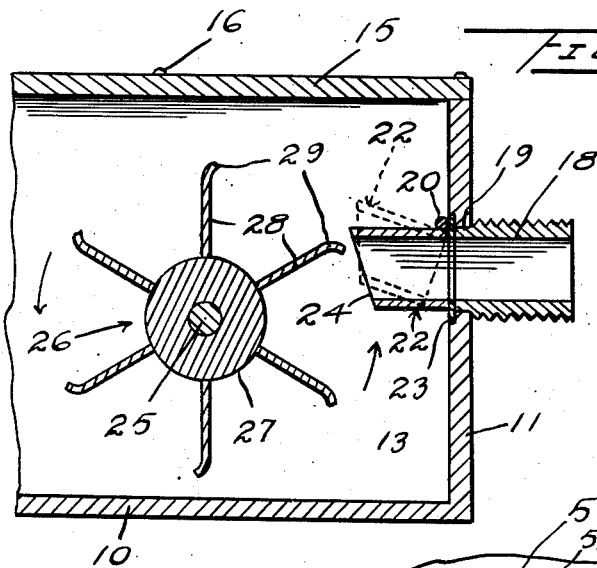
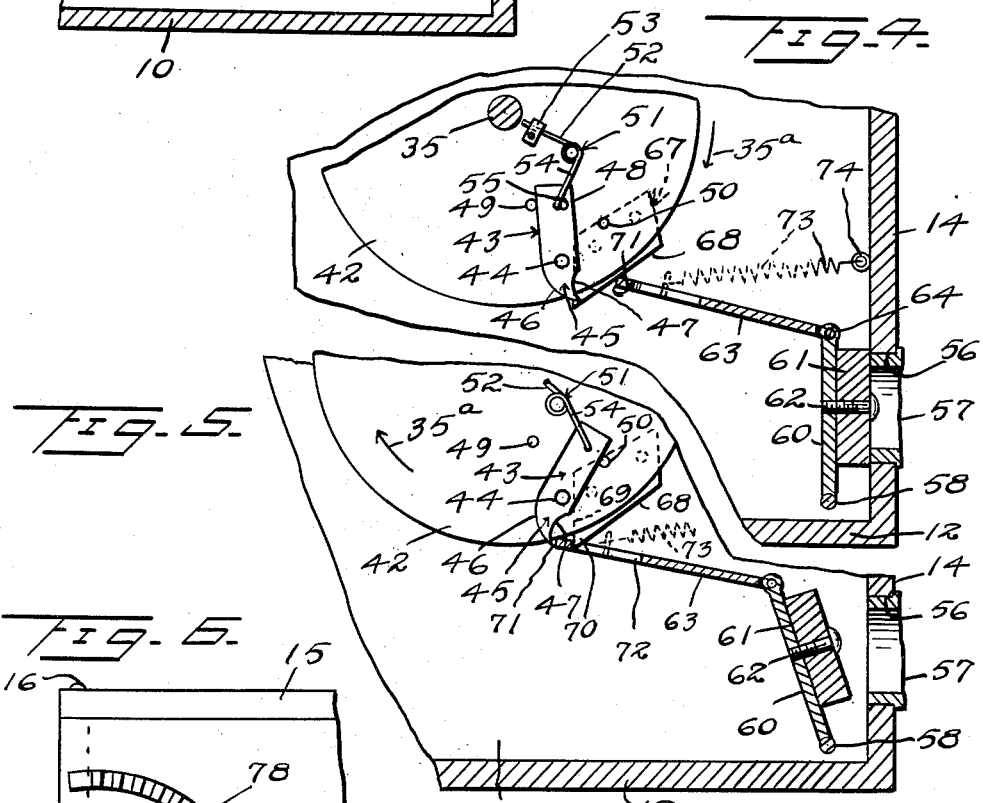
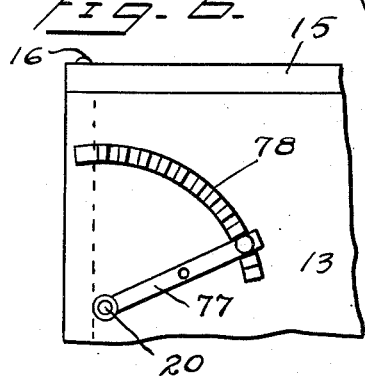
INVENTOR
I.C. Schantz
BY John N. Randolph
ATTORNEY United States Patent Office 2,761,587
Patented Sept. 4, 1956

2,761,587

AUTOMATIC WATER SHUTOFF DEVICE

Irving C. Schantz, Manchester, N. H.

Application February 28, 1955, Serial No. 490,814

7 Claims. (Cl. 222—20)

This invention relates to a device of extremely simple construction primarily adapted for use in connection with the sprinkling of lawns to be interposed in a hose or conduit of a lawn sprinkler for automatically shutting off the flow of water to the sprinkler after a predetermined amount of water has passed through the control unit or after a predetermined time interval.

More particularly, it is an aim of the present invention to provide a unit of extremely simple construction which is actuated primarily by the flow of water therethrough for shutting off the flow of water.

Still another object of the invention is to provide such a unit which may be readily adjusted for varying the amount of water which will pass therethrough before the flow is automatically interrupted.

Various other objects and advantages of the invention will hereinafter become more fully apparent from the following description of the drawings, illustrating a presently preferred embodiment thereof, and wherein:

Figure 1 is a top plan view, partly in section, showing the control unit with the cover plate of the housing thereof removed and in a closed position;

Figure 2 is a longitudinal sectional view of the unit, taken substantially along a plane as indicated by the line 2—2 of Figure 1 and with the cover plate applied;

Figure 3 is an enlarged fragmentary transverse sectional view, taken substantially along a plane as indicated by the line 3—3 of Figure 1;

Figure 4 is an enlarged fragmentary horizontal sectional view, taken substantially along a plane as indicated by the line 4—4 of Figure 2;

Figure 5 is a view similar to Figure 4 but showing the control unit after being reset in an open position, and Figure 6 is a fragmentary end elevational view of a part of the unit, looking from left to right of Figure 1.

Referring more specifically to the drawings, the automatic shutoff device or unit in its entirety and comprising the invention is designated generally 8 and includes a housing or casing, designated generally 9, having a bottom 10, side walls 11 and 12, end walls 13 and 14 and a top wall 15. The top wall 15 is removable and is retained in an applied postion by suitable fastenings 16. The walls 10, 13, 14 and 15 are provided with recesses 17 which open inwardly thereof and which form journals for shafts, as will hereinafter be described.

As best seen in Figures 1 and 3, a tubular inlet coupling element 18 has a discharge end secured in an opening 19 of the wall 11, adjacent the wall 13 and extends outwardly therefrom. A shaft 20 extends along a part of the inner side of the wall 11 above and adjacent the opening 19 and has one end journalled in a bearing 21 which is secured to the inner side of said wall 11 and an opposite end extending outwardly through and journalled in the wall 13. A short section of tubing 22, forming a nozzle, has an inner end disposed beneath and suitably secured to a part of the shaft 20 by means of which the nozzle 22 is swingably supported within the casing 9. A sealing gasket or washer 23 seats in the inner end of the opening 19 against an end of the coupling 18, and an inner end of the nozzle 22 abuts against the gasket 23 in one position of said nozzle, as illustrated in full lines in Figure 3. The nozzle 22 has a downwardly and inwardly beveled opposite free end 24, constituting the discharge end thereof.

A shaft 25 is disposed in the casing 9 and longitudinally thereof and has its ends journalled in recesses 17 of the walls 13 and 14. A water wheel, designated generally 26, is fixed to a part of the shaft 25 and is disposed in alignment with the nozzle 22. Said water wheel comprises a hub 27 which is fixed to the shaft 25 and a plurality of blades or vanes 28 which are fixed to and project radially from the hub 27 and which are disposed in circumferentially spaced apart relation to one another. The blades or vanes 28 preferably have outer end portions 29 which are flared or curved in a clockwise direction, as seen in Figure 3.

A shaft 30, which has its ends journalled in recesses 17 of the walls 10 and 15, has a worm gear 31 fixed thereto and which meshes with a worm 32 which is fixed to the shaft 25. Three additional shafts 33, 34 and 35 are disposed in the casing 9 and have their ends journalled in recesses 17 of the walls 10 and 15. A large gear 36, of approximately the diameter of the worm gear 31, is fixed to the shaft 33 and meshes with a small pinion 37 which is fixed to the shaft 30. A large gear 38 is fixed to the shaft 34 and meshes with a pinion 39, of substantially smaller diameter, which is fixed to the shaft 33. Another large gear 40 is fixed to the shaft 35 and meshes with a substantially smaller pinion 41, which is fixed to the shaft 34, so that the shaft 35 will be driven at a substantially reduced speed of rotation relative to the R. P. M. of the water wheel shaft 25.

A disk 42 is fixed to the shaft 35 substantially below the gear 40. As best seen in Figures 4 and 5, a trigger 43 is swingably mounted on the upper side of the disk 42 by a pivot pin 44 which extends loosely therethrough and is secured in the disk 42, adjacent a portion of the periphery of the disk. A nose portion or end 45 of the trigger 43, which is disposed relatively near the pivot 44, extends outwardly past a peripheral portion of the disk 42 and has a convexly rounded leading edge 46 and a recessed trailing edge portion 47. The other inner portion 48 of the trigger 43, which extends a greater distance from the pivot 44 than the nose 45, is disposed for swinging movement between a pair of upstanding studs forming stops 49 and 50 which are secured to and rise from the disk 42. A spring 51 has one leg 52 secured in a fixed position by a clamp 53 to the upper side of the disk 42. The other leg 54 of the spring 51 has a downturned terminal portion which loosely engages in an opening 55 of the trigger portion 48. The spring legs 52 and 54 tend to assume substantially aligned positions relative to one another and accordingly urge the trigger 43 to swing on its pivot 44 to its position of Figure 5 in engagement with the stop 50 and wherein the trigger is disposed at a substantial angle to a radius of the disk 42 and with only the tip of the nose 45 protruding past the periphery of the disk 42.

The end wall 14 is provided with an outlet opening 56, located adjacent the side wall 12 and bottom 10 and in which is secured an inner or inlet end of a hose coupling 57 which extends outwardly from the wall 14.

A shaft 58 extends into the casing 9 through the bottom 10 and is journalled in said bottom 10 and in a bearing 59 which is fixed to the inner side of the wall 14. An arm 60 is fixed to the shaft 58 and is disposed within the casing 9. The arm 60 extends transversely from the shaft 58 and has a valve member 61 disposed against one side thereof and secured thereto by a fastening 62. The valve 61 is swingable with the shaft 58 and arm 60 in one direction into a position against the inner end of the outlet coupling 57 for closing the outlet of the liquid flow control device 8, as illustrated in Figures 1, 2 and 4. One end of an elongated latching plate 63 is connected by a hinge joint 64 to the other, free end of the arm 60 whereby said latching plate is swingably movable with the arm 60 and shaft 58 and is also capable of swinging movement relative to the arm 60 about the axis of the hinge pivot 64, which is disposed parallel to the axis of the shaft 58.

A stationary latch keeper 65 is secured in the casing 9 beneath a part of the disk 42 to the bottom 10 by fastenings 66. The latch keeper 65 has a top portion or plate 67 which is disposed beneath and adjacent a portion of the disk 42 and which has an outer substantially straight edge 68 which is disposed beyond an adjacent peripheral portion of the disk 42 and substantially parallel to a tangent thereof. An end of the edge 68, which is located remote from the end wall 14, forms an acute angle with an edge 69 of the plate 67 to provide a point 70. The latch plate 63 near its free end 71 is provided with an opening 72 to engage over the point 70, as illustrated in Figure 5, for holding the valve 61 in an open position out of engagement with the outlet coupling 57. A contractile coil spring 73 has one end anchored by an eye fastening 74 to the wall 14 and is connected at its opposite end to the plate 63 by an eye fastening 75 which projects from the upper edge of said plate near the free end 71 thereof. As seen in Figures 1 and 4, the eye fastening 74 is located more remote from the shaft 58 than the hinge 64, so that the spring 73 urges the latch plate 63 to swing toward the disk 42 and the keeper plate 67 and also urges the keeper plate 63, the arm 60 and valve 61 to swing with the shaft 58 toward the wall 14.

The spring 51 constitutes a weak spring which is capable of moving the trigger 43 to its position of Figure 5 when the latch plate 63 is in a released position, as seen in Figure 4, and when the valve is in a closed position. With the parts thus disposed, the end 71 of the latch plate 63 bears against the keeper plate edge 68 and the nose 45 is disposed in advance of the point 70 of the keeper plate 67, as seen in Figure 5. The lower exposed end of the shaft 58 has a handle or lever 76 secured thereto by which the shaft 58 can be turned in a counterclockwise direction as seen in Figure 4 to swing the arm 60 and valve 61 away from the outlet fitting 57 and to the open position of the valve as seen in Figure 5. This movement of the arm 60 will cause the latch plate 63 to be displaced from right to left as seen in Figure 4 with its end 71 riding along the keeper plate edge 68 until the opening 72 assumes a position as seen in Figure 5 to receive the point 70 of the keeper plate, at which time the spring 73 will swing the keeper plate 63 clockwise on its pivot 64 into a latched position in engagement with the point 70, as seen in Figure 5, and with the free end 71 of the keeper plate disposed between the point 70 and the trigger nose 45, for thus setting the flow control apparatus 8 in an open position.

The outer end of the shaft 20, which projects outwardly from the end wall 13, has a crank handle 77 secured thereto and disposed to swing relative to a toothed quadrant 78 which is secured to the outer surface of the wall 13. A resilient latch element 79 is carried by the crank handle 77 and has a free end spring biased into engagement with the teeth of the quadrant 78 to retain the shaft 20 in different positions to which it is turned by operation of the lever 77. Thus, by swinging the handle 77 upwardly from its position of Figure 6 in a counterclockwise direction, the nozzle 22 will be swung upwardly in a clockwise direction from its full line toward its dotted line position of Figure 3. It will also be apparent that when the nozzle 22 is in its dotted line position of Figure 3 water discharged therefrom will impinge against the outer portions of the vanes 28 to turn the water wheel 26 more rapidly in a counterclockwise direction as seen in Figure 3, than if the nozzle 22 is in its full line position of Figure 3 to direct the water more nearly radially of the water wheel and toward its hub 27. Thus, by tilting the nozzle upwardly the water wheel 26 and consequently the disk 42 will revolve more rapidly resulting in the valve 61 being closed in less time and after less water has passed through the control device 8 than if the nozzle 22 is in its full line lowered position of Figure 3. Obviously, the nozzle 22 can be located in intermediate positions between its full line and dotted line positions of Figure 3 by engagement of the latch 79 with selected teeth of the quadrant 78.

Assuming that the valve 61 is latched in its open position of Figure 5, as previously described and that the nozzle 22 is latched in a desired position, as previously described, the control unit 8 is interposed in a flow line, as for example in a hose leading to a lawn sprinkler, not shown. The inlet fitting 18 is preferably connected to the hose adjacent the source of water supply under pressure and the outlet fitting 57 is connected to a longer hose section leading to the sprinkler, so that the unit 8 is normally supported off of the ground by the supply conduit connected to its inlet fitting 18. As the water enters the casing 9 under pressure through the nozzle 22, it will drive the water wheel 26 in a counterclockwise direction as seen in Figure 3. Accordingly, the shafts 25, 30, 33, 34 and 35 with the parts carried thereby will be revolved in the direction as indicated by the arrows 25a, 30a, 33a, 34a and 35a, respectively, as seen in Figure 1. It will also be apparent that the aforementioned gears, pinions and worm form a reduction gear drive so that the shaft 35 and the disk 42 fixed thereto will rotate very slowly compared to the R. P. M. of the shaft 25. Accordingly, the disk 42 will be revolved clockwise as seen in Figures 4 and 5 from its starting position of Figure 5. As the disk nearly completes a revolution, the tip of the nose 45 will strike the latch plate 63 and a further clockwise movement of the disk 42 will cause the trigger 43 to swing counterclockwise on its pivot 44 against the action of the weak spring 51 to its position of Figure 4, relative to the disk 42 so that the nose 45 will thus be displaced outwardly from the disk periphery. Thereafter, a slight additional clockwise movement of the disk 42 and trigger 43 will cause the nose 45 by engagement with the latch plate 63 to cam the latch plate away from the disk 42 to disengage it from the keeper point 70, whereupon the spring 73 will move the latch plate 63 from its position of Figure 5 to its position of Figure 4 and in so doing will close the valve 61 to shut off the escape of water from the unit 8. After movement of the sprinkler, the unit 8 can be reset in an open position, as previously described, by operating the handle 76 to again swing the shaft 58 counterclockwise as seen in Figure 4, and as previously described, to relatch the plate 63 with the keeper point 70. Before this can be accomplished, the weak spring 51 will have returned the trigger 43 to its position of Figure 5 so that the nose 45 thereof will not provide an obstruction to the latch plate end 71.

Various modifications and changes are contemplated and may obviously be resorted to, without departing from the spirit or scope of the invention as hereinafter defined by the appended claims.

I claim as my invention:

1. An automatic shutoff device comprising a casing having an inlet adapted to receive a liquid under pressure and an outlet disposed remote from said inlet, a shaft journalled in said casing, a water wheel fixed to said shaft and disposed adjacent said inlet to be driven in one direction by the liquid under pressure impinging thereagainst for turning the water wheel shaft in one direction only, a shaft journalled in said casing and disposed adjacent said outlet, a disk fixed to said last mentioned shaft, reduction gearing contained in said casing forming a driving connection between said shafts for causing said last mentioned shaft and disk to be turned at a very slow speed relative to the R. P. M. of said first mentioned shaft, a valve supporting arm swingably mounted in said casing, adjacent the outlet thereof, for swinging movement toward and away from said outlet, a valve carried by said arm and swingably movable therewith in one direction to a position for closing the outlet and in the opposite direction to an open position of the valve, a stationary keeper fixed to said casing on one side of said disk and having a point projecting outwardly from a portion of the periphery of the disk, a latch plate pivotally connected to a free end of said arm, spring means connected to the latch plate and casing and urging said latch plate to swing in one direction relative to the arm, said latch plate having an opening disposed to engage over the point of said keeper when the valve is in an open position, said latch plate being swingable by said spring in a direction toward the keeper and into latching engagement therewith, and a trigger carried by said disk and having a nose portion projecting beyond a portion of the periphery of the disk for engaging the latch plate to swing the latch plate out of engagement with said keeper as said trigger is carried by the disk past the keeper for permitting said spring means to swing said valve to a closed position after disengagement of the latch plate from the keeper.

2. An automatic shutoff device as in claim 1, and means connected to said valve supporting arm projecting outwardly from the casing and adapted to be manually actuated for swinging the valve to an open position and for cooperating with said spring means to return the latch plate to a position in latching engagement with the keeper.

3. An automatic shutoff device as in claim 2, said keeper having an edge portion disposed to be slidably engaged by the free end of said latch plate for cooperating with said spring means in guiding the latch plate into latching engagement with the keeper when the valve is swung to an open position and for limiting swinging movement of the latch plate relative to the arm when said latch plate is released from latching engagement with the keeper to cause the spring means to exert a pull on the latch plate for swinging the arm in a direction to move the valve to a closed position.

4. An automatic shutoff device as in claim 1, means pivotally mounting the trigger on said disk, abutment means secured to the disk and between which a portion of the trigger is swingably disposed for limiting swinging movement of the trigger relative to the disk and whereby the nose of the trigger is swingably movable relative to the disk away from said keeper after release of the latch plate to permit the latch plate to be returned to a position in latching engagement with said keeper.

5. An automatic shutoff device as in claim 4, and a spring engaging said trigger and urging the nose thereof away from the keeper after release of the latch plate.

6. An automatic shutoff device as in claim 1, a nozzle disposed in said casing and forming an extension of said inlet, and means adapted to be manually operated for adjustably positioning the nozzle relative to the water wheel for varying the speed at which the water wheel will be revolved.

7. An automatic shutoff device comprising a casing having an inlet through which a liquid under pressure is adapted to be supplied to the casing and an outlet disposed remote from said inlet, a valve for closing said outlet, valve supporting means swingably mounted in said casing and on which said valve is supported, a stationary keeper fixed to said casing, a latch plate pivotally connected to said valve supporting means for swinging movement therewith and relative thereto and having a portion for engagement with said keeper, spring means connected to said latch plate for urging the latch plate to swing relative to the valve supporting means into latching engagement with the keeper as the valve supporting means is swung in a direction to move the valve to an open position and for returning the valve to a closed position when the latch plate is released from the keeper, and means driven by the pressure of the liquid entering said casing including a rotatably movable part for engaging said latch plate to release the latch plate from the keeper.

References Cited in the file of this patent

UNITED STATES PATENTS

| | | |
|---|---|---|
| 1,859,357 | Elder | May 24, 1932 |
| 2,589,650 | Wolcott | Mar. 18, 1952 |
| 2,698,111 | Wiley | Dec. 28, 1954 |